(12) United States Patent
Lin et al.

(10) Patent No.: US 12,122,052 B2
(45) Date of Patent: Oct. 22, 2024

(54) SWEPT VOLUME DEFORMATION

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 351 days.

(21) Appl. No.: 17/654,929

(22) Filed: Mar. 15, 2022

(65) Prior Publication Data
US 2023/0294287 A1    Sep. 21, 2023

(51) Int. Cl.
*B25J 9/16*      (2006.01)
*G05B 19/4061*    (2006.01)

(52) U.S. Cl.
CPC ........... *B25J 9/1666* (2013.01); *B25J 9/1607* (2013.01); *G05B 19/4061* (2013.01); *G05B 2219/39082* (2013.01); *G05B 2219/40327* (2013.01)

(58) Field of Classification Search
CPC ........ B25J 9/1666; B25J 9/1607; B25J 9/163; G05B 19/4061; G05B 2219/39082; G05B 2219/40327; G05B 2219/40476; G05B 2219/45104; G05B 2219/40477
See application file for complete search history.

(56) References Cited

U.S. PATENT DOCUMENTS

| | | | | |
|---|---|---|---|---|
| 4,888,707 A | * | 12/1989 | Shimada | B25J 9/1666 700/255 |
| 5,150,452 A | * | 9/1992 | Pollack | B25J 9/1676 700/255 |
| 8,185,265 B2 | * | 5/2012 | Nagano | B25J 9/1666 701/25 |
| 11,385,759 B2 | * | 7/2022 | Arimatsu | A63F 13/5375 |

(Continued)

FOREIGN PATENT DOCUMENTS

| | | | | |
|---|---|---|---|---|
| CN | 110228069 A | * | 9/2019 | B25J 9/1666 |
| CN | 110919661 A | * | 3/2020 | B25J 9/1666 |

OTHER PUBLICATIONS

CN-110228069-A translation (Year: 2019).*

(Continued)

*Primary Examiner* — Kyle T Johnson
(74) *Attorney, Agent, or Firm* — John A. Miller; Shumaker, Loop & Kendrick, LLP

(57) ABSTRACT

A robot interference checking motion planning technique using swept volume deformation. A rapidly-exploring random tree (RRT) algorithm generates random sample nodes between a start point and a goal point. Each sample node is evaluated by checking for robot-obstacle interference along a path segment to the node. If an interference exists along the path segment, a swept volume of the segment is used to identify a critical posture where the interference is greatest, and obstacle interference points are used to define a virtual force applied to the robot links to modify the path segment to alleviate the interference condition. A swept volume of the (Continued)

modified path segment is computed and evaluated. If the modified swept volume is collision-free and the modified path segment motion plan meets robot joint range criteria, the modified path segment and the sample node are added to the overall robot motion program.

20 Claims, 8 Drawing Sheets

(56) References Cited

U.S. PATENT DOCUMENTS

| | | | | |
|---|---|---|---|---|
| 2008/0125893 | A1* | 5/2008 | Tilove | B25J 9/1666 |
| | | | | 700/103 |
| 2009/0006043 | A1* | 1/2009 | Petersik | G09B 23/28 |
| | | | | 703/1 |
| 2012/0215351 | A1* | 8/2012 | McGee | B25J 9/1676 |
| | | | | 700/248 |
| 2013/0297574 | A1* | 11/2013 | Thiyanaratnam | G06T 9/005 |
| | | | | 707/693 |
| 2013/0325030 | A1* | 12/2013 | Hourtash | B25J 9/1676 |
| | | | | 606/130 |
| 2017/0210008 | A1* | 7/2017 | Maeda | B25J 9/1682 |
| 2018/0117470 | A1* | 5/2018 | Chiu | A63F 13/577 |
| 2018/0250818 | A1* | 9/2018 | Maeda | B25J 9/1682 |
| 2020/0198140 | A1* | 6/2020 | Dupuis | B25J 9/1666 |
| 2020/0298406 | A1* | 9/2020 | Griffiths | B25J 9/1676 |
| 2020/0338733 | A1* | 10/2020 | Dupuis | B25J 9/1666 |
| 2023/0173674 | A1* | 6/2023 | Lin | B25J 9/1605 |
| | | | | 700/245 |
| 2023/0294287 | A1* | 9/2023 | Lin | G05B 19/4061 |
| | | | | 700/255 |
| 2024/0123618 | A1* | 4/2024 | Lin | G06F 30/10 |

OTHER PUBLICATIONS

CN-110919661-A translation (Year: 2020).*

Kuffner, James J., and Lavalle Steven M., "RRT-connect: An efficient approach to single-query path planning." Proceedings 2000 ICRA.

* cited by examiner

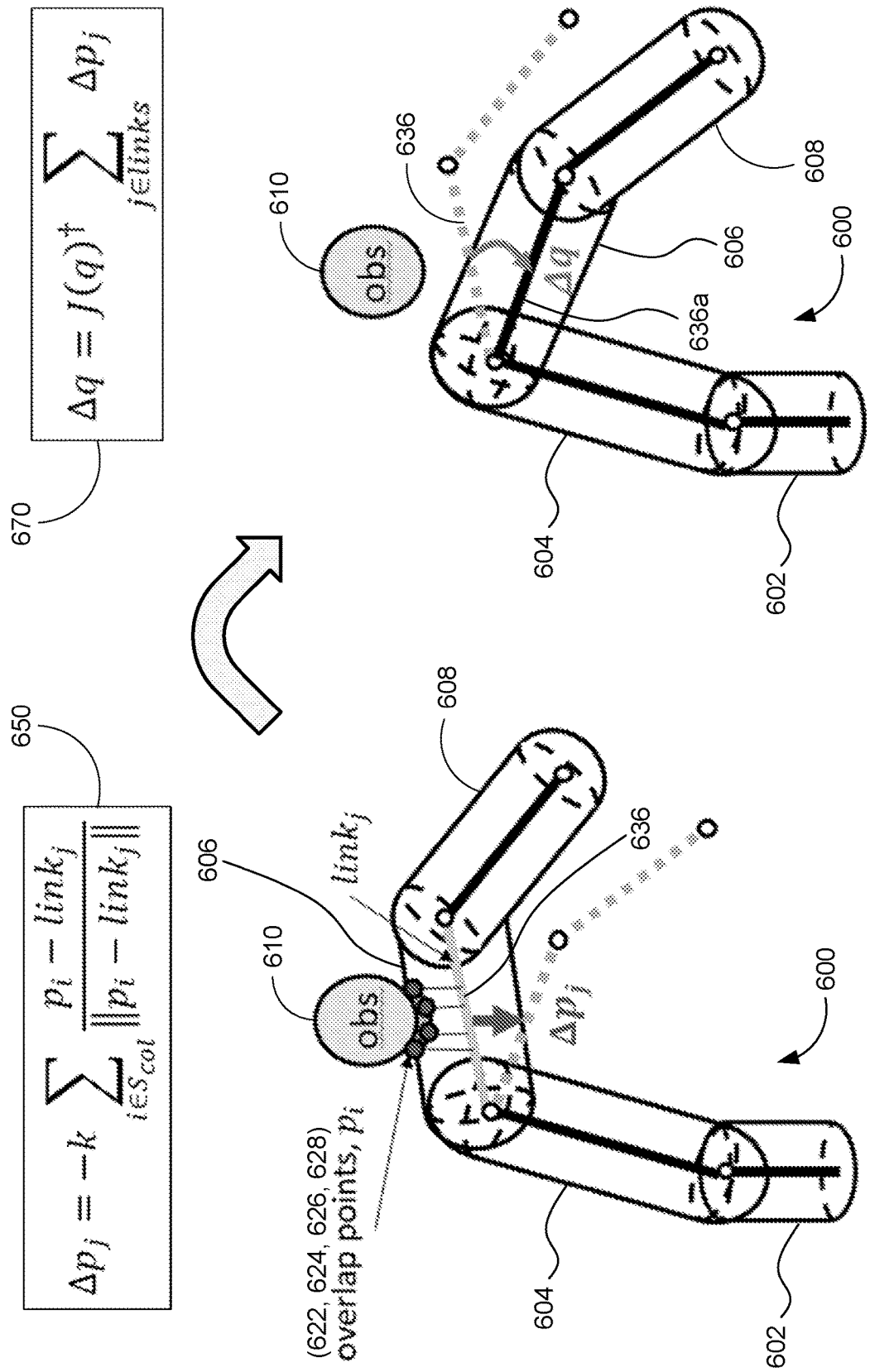

SWEPT VOLUME DEFORMATION

BACKGROUND

Field

The present disclosure relates to the field of industrial robot motion control and, more particularly, to a robot interference checking motion planning technique which generates random sample nodes between a start point and a goal point, computes a motion plan for a path segment to a next sample node, and if an interference exists along the path segment, uses a swept volume of the segment to determine the severity of the interference and compute a revised motion plan for the segment which resolves non-severe interferences.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures, or the obstacles may be temporary or mobile. A large workpiece which is being operated on by the robot may itself be an obstacle, as the robot must maneuver in or around the workpiece while performing an operation such as welding. In multi-robot workspace environments, each robot is a potential obstacle for other robots. Collisions between any part of the robot and any obstacle must absolutely be avoided.

It is known to include interference checking algorithms in robot motion planning routines, including during real-time motion/path planning. A known path planning technique used in obstacle-intensive robot environments is rapidly-exploring random tree (RRT), which generates random sample points to ultimately connect a start point to a goal point, where each "point" is actually a complete robot pose. The RRT technique checks the feasibility of each sample point by determining whether a robot motion segment from a current feasible point to the next sample point is collision-free. If the motion segment is not collision-free, the sample point is discarded and a new sample point is randomly generated and evaluated. If the motion segment is collision-free, the sample point is added to the tree, and a new sample point is randomly generated.

Although the RRT technique is effective in finding a collision-free path from a start point to a goal point, it can be inefficient in obstacle-intensive robot environments because of the low probability of a motion segment to a proposed sample point being collision-free. Because traditional RRT implementations do not consider the severity of robot-obstacle collisions along proposed motion segments, many sample points with only minor interference conditions are discarded, which causes the tree to either grow very slowly, or grow in an inefficient direction.

In light of the circumstances described above, there is a need for an improved robot interference checking path planning technique which considers the severity of robot-obstacle collisions and modifies motion segments to resolve minor interferences rather than discarding the proposed sample point.

SUMMARY

The present disclosure describes a robot interference checking motion planning technique using swept volume deformation. A rapidly-exploring random tree (RRT) algorithm generates random sample nodes between a start point and a goal point. Each sample node is evaluated by checking for robot-obstacle interference along a path segment to the node. If an interference exists along the path segment, a swept volume of the segment is used to identify a critical posture where the interference is greatest, and obstacle interference points are used to define a virtual force applied to the robot links to modify the path segment to alleviate the interference condition. A swept volume of the modified path segment is computed and evaluated. If the modified swept volume is collision-free and the modified path segment motion plan meets robot joint range criteria, the modified path segment and the sample node are added to the overall robot motion program.

Additional features of the presently disclosed devices and methods will become apparent from the following description and appended claims, taken in conjunction with the accompanying drawings.

BRIEF DESCRIPTION OF THE DRAWINGS

FIG. 6A is a static virtual force and geometry diagram of a robot which illustrates virtual forces applied to robot links in order to avoid an interference with an obstacle, and FIG. 6B is a geometry diagram of the robot of FIG. 6A which illustrates how robot pose changes due to the virtual forces to avoid the interference with the obstacle, according to an embodiment of the present disclosure;

DETAILED DESCRIPTION OF THE EMBODIMENTS

The following discussion of the embodiments of the disclosure directed to robot interference checking path planning using swept volume deformation is merely exemplary in nature, and is in no way intended to limit the disclosed devices and techniques or their applications or uses.

It is well known to use industrial robots for a variety of manufacturing, assembly and material movement operations. In many robot workspace environments, obstacles are present and may be in the path of the robot's motion—that is, the obstacles may be located between where a robot is currently positioned and the robot's destination position. The obstacles may be permanent structures such as machines and fixtures, or the obstacles may be temporary or mobile. A large workpiece—being operated on by a robot—may itself be an obstacle, as the robot must maneuver in or around the workpiece while performing an operation such as welding. One robot in a workspace can also be a potential obstacle to another robot.

Figure 1:
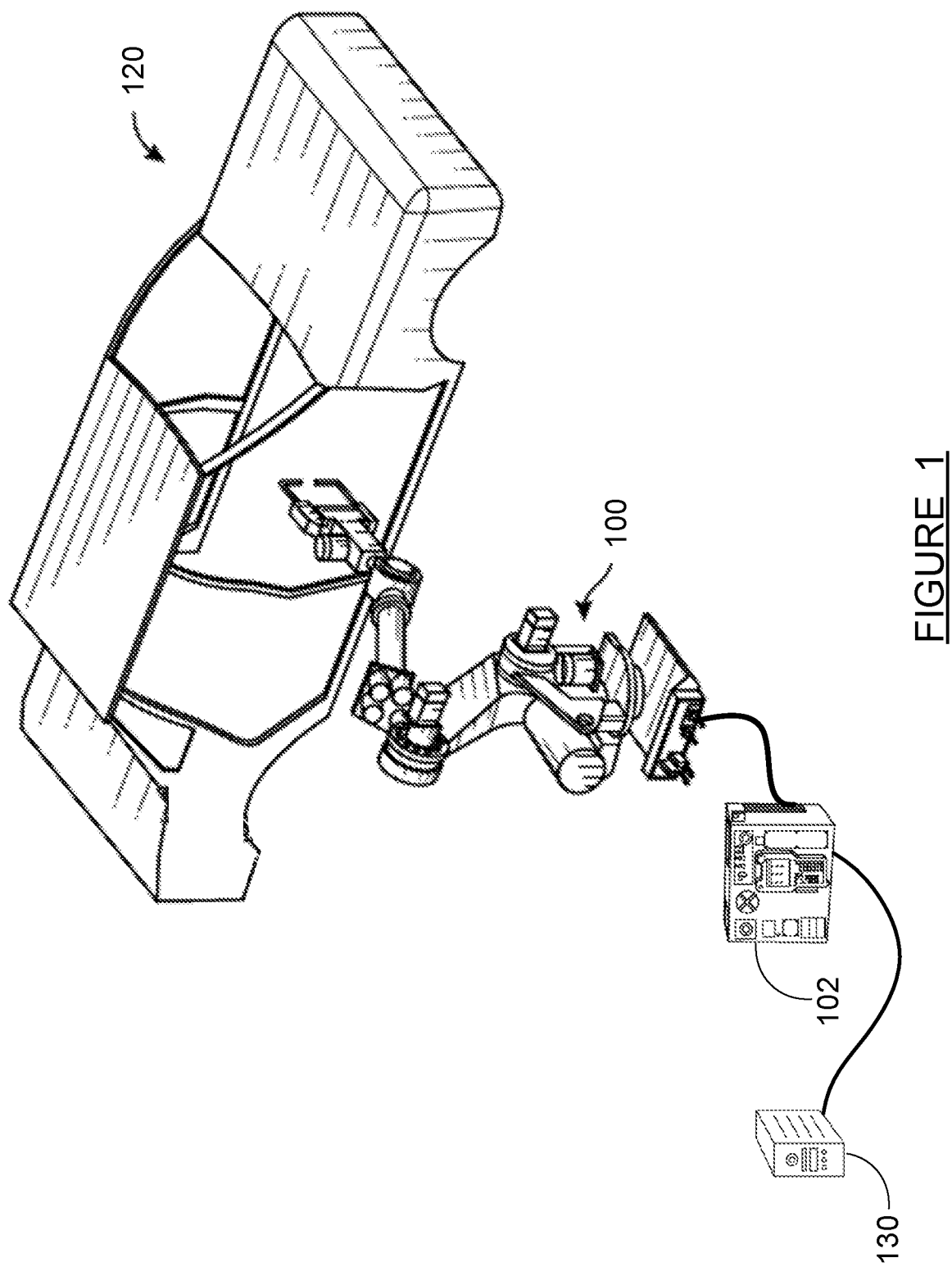
FIG. 1 is an illustration of an industrial robot performing an operation on a vehicle body workpiece which is itself an obstacle.

FIG. 1 is an illustration of an industrial robot 100 performing an operation on a vehicle body workpiece 120 which is itself an obstacle. In the workspace of FIG. 1, the robot 100 is performing spot welding tasks on various locations of the workpiece 120. The spot welding includes locations in the interior of the vehicle body, requiring the robot 100 to reach inside the door openings. In this application, the vehicle body workpiece 120 is itself an obstacle to the motion of the robot 100. Operation of the robot 100 on and around the vehicle body workpiece 120 requires interference check calculations to be performed for all planned motions.

The robot 100 communicates with a controller 102, typically via a cable. As known in the art, the controller 102 provides joint motor control signals to command the robot to move according to a defined motion program. The controller 102 also commands the operation of a tool affixed to the robot 100, such as the spot welder tool shown in FIG. 1. A computer 130 may be provided to compute the motion program for each upcoming move of the robot 100, particularly in environments where each robot movement must be computed in real time due to the presence of moving obstacles, moving workpieces, etc.

Techniques have been developed in the art for computing robot motions such that the tool follows a path which avoids collision of any part of a robot with any obstacles. Such techniques generally involve two parts—defining a proposed robot motion program, and checking for robot-obstacle interferences at path points along the motion program.

The interference checking calculations at discrete path points may be performed using a variety of methods. One method represents the robot links as geometry primitives (spheres, cylinders, etc.) to reduce calculation complexity, but at the expense of accuracy. Another method represents the robot links using their actual shapes defined by computer aided design (CAD) data, which is accurate by computationally expensive. Other techniques for interference checking in robot motion planning also exist—including a signed distance field technique, and an axis-aligned bounding box tree technique. Yet another interference checking method—using point sets converted to 1D indices—is discussed further below.

Regardless of the method used for the interference checking calculations, it is necessary for a robot motion program to be defined which moves the robot to a location (a goal point or pose) to perform an operation. In obstacle-intensive environments, it is known to use a rapidly-exploring random tree (RRT) method to create a motion program which moves a robot from a start point to a goal point by building a tree of intermediate nodes, where random sample nodes are evaluated for collision avoidance before being added to the motion program.

Figure 2A:
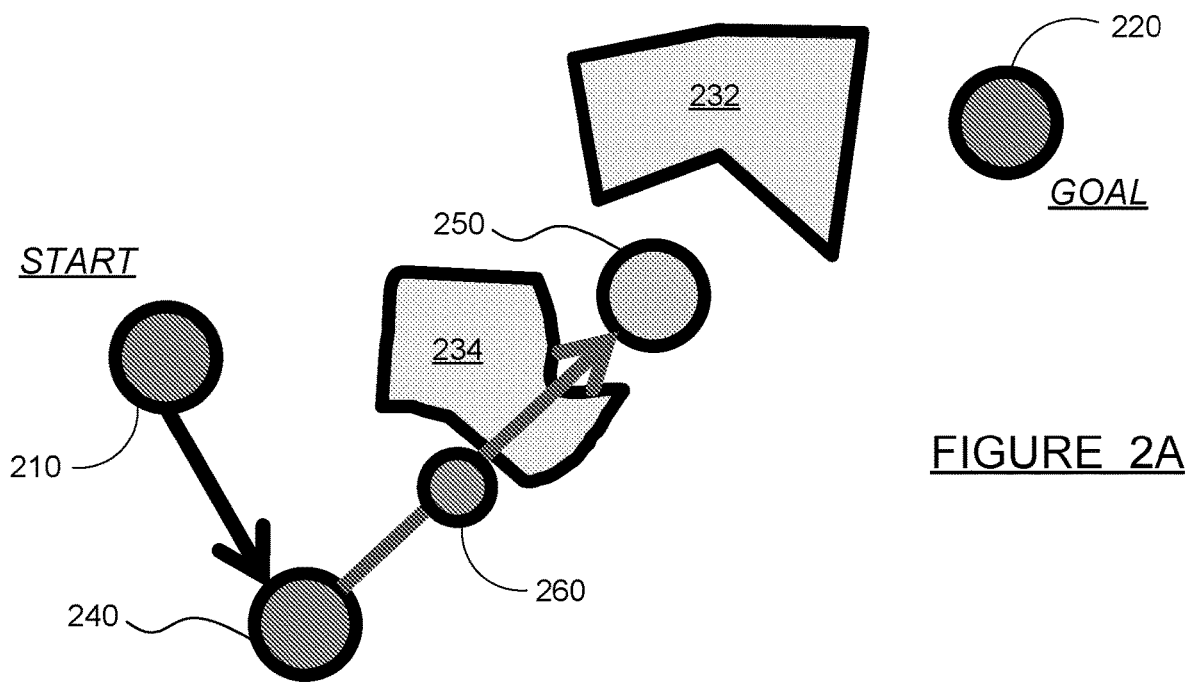
FIGS. 2A and 2B are illustrations of an RRT path planning process in which a motion segment to a proposed sample node encounters a major obstacle and a minor obstacle, respectively.
Figure 2B:
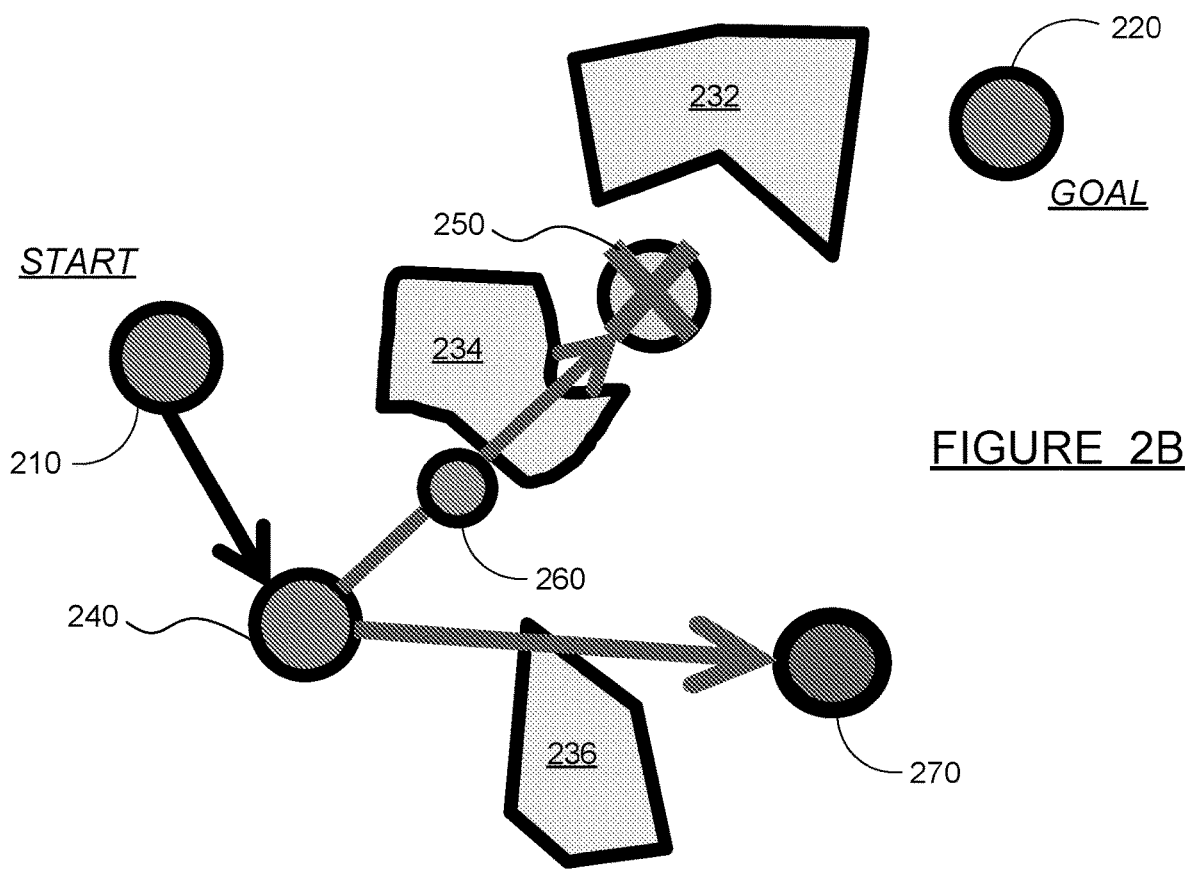

FIGS. 2A and 2B are illustrations of an RRT path planning process in which a motion segment to a proposed sample node encounters a major obstacle and a minor obstacle, respectively. FIGS. 2A and 2B are drawn in two dimensions (2D) for clarity, but it is to be understood that all of the disclosed robot motion planning is done in three dimensions (3D). Specifically, the obstacles are 3D objects such as the door frame shown in FIG. 1, and the start, goal and sample "points" are actually 3D robot poses including a position and orientation of the tool and a corresponding complete set of robot joint positions.

In FIG. 2A, the objective of the RRT calculation is to find a collision-free path from a start point 210 to a goal point 220. Obstacles 232 and 234 exist in the robot working environment. In real world applications, many more obstacles may exist. As known in the art, the RRT method successively proposes a random sample node, and evaluates a path from a current location (an end of a tree branch) to the proposed sample node. Beginning from the start point 210, a sample node 240 was previously proposed, and the path from the start point 210 to the sample node 240 was found to be feasible (collision-free). The feasible node 240 is therefore added to the tree.

A new random sample node 250 is now proposed, and a path from the feasible node 240 to the sample node 250 is evaluated. The path from the feasible node 240 to the sample node 250 is found to be blocked by the obstacle 234; thus, a direct path from the node 240 to the node 250 is not feasible. The obstacle 234 is a major obstruction to the path from the node 240 to the node 250, as the path cuts across a wide portion of the obstacle 234. Using traditional RRT methods, the best that can be done in this case is to find an intermediate node 260 which is feasible to reach from the node 240, and add the node 260 to the tree.

In FIG. 2B, the proposed sample node 250 is discarded, and a new random sample node 270 is proposed. A new obstacle 236 is also shown, as it is relevant to the path planning to the node 270. The path from the feasible node 240 to the sample node 270 is found to be blocked by the obstacle 236; thus, a direct path from the node 240 to the node 270 is not feasible. Using traditional RRT methods, the node 270 would be discarded, and an intermediate node (not shown) which is feasible to reach from the node 240 could be identified and added to the tree. However, traditional RRT methods do not distinguish between a major obstruction and a minor obstruction.

In robot path planning, which is much more complex than the simple 2D path examples of FIGS. 2A/2B, one interference checking technique uses swept volumes of each proposed motion segment to determine if any part of the robot interferes with any obstacle during the motion segment. It can be seen in FIG. 2B that the obstacle 236 is a minor obstruction to the path from the node 240 to the node 270, as the path cuts across a small tip of the obstacle 236. The present disclosure provides a technique for using the swept volume of the proposed path to determine the severity of any robot-obstacle interference, and applying a transformation to the robot motion segment which "deforms" the swept volume in a manner which resolves minor obstructions. The technique is discussed in detail below.

Figure 3:
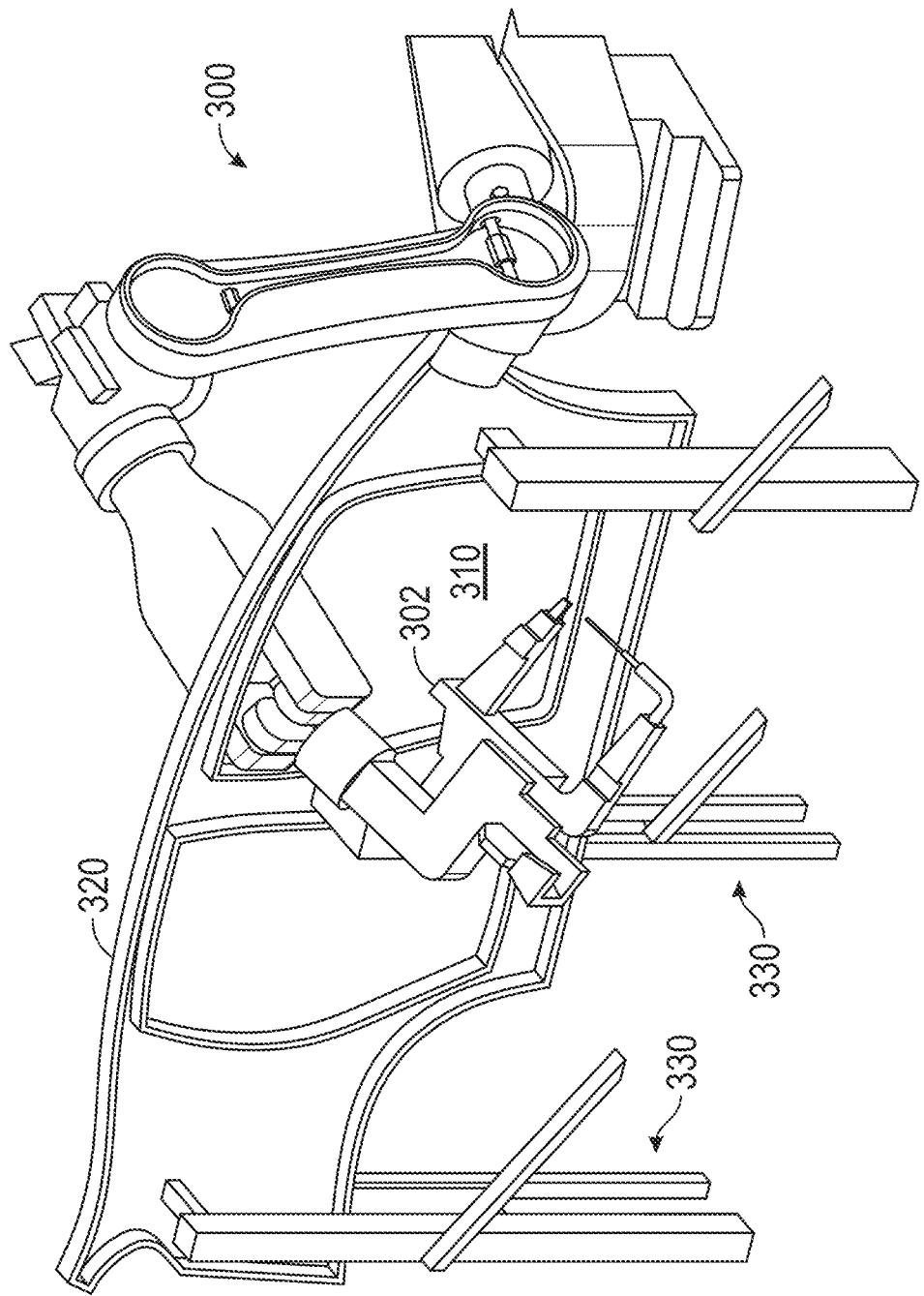
FIG. 3 is an isometric view illustration of a robot reaching through a vehicle body door opening to perform an operation, depicting a case used to exemplify the swept volume deformation path planning method of the present disclosure.

FIG. 3 is an isometric view illustration of a robot 300 reaching through a door opening 310 of a vehicle body 320 to perform an operation, depicting a case used to exemplify the swept volume deformation path planning method of the present disclosure. In a scenario similar to FIG. 1, the robot 300 moves a tool 302 to a prescribed position and orientation to perform a spot welding operation, then moves on to a next location. In the configuration of FIG. 3, the spot welding operation is somewhere on the interior of the vehicle body 320, so the robot 300 has reached the tool 302 through the door opening 310 to perform the operation. The vehicle body 320 is illustrated as being held by support fixtures 330, as this is a configuration which was used in validation of the disclosed methods. This set up is used in the examples discussed below.

Figure 4:
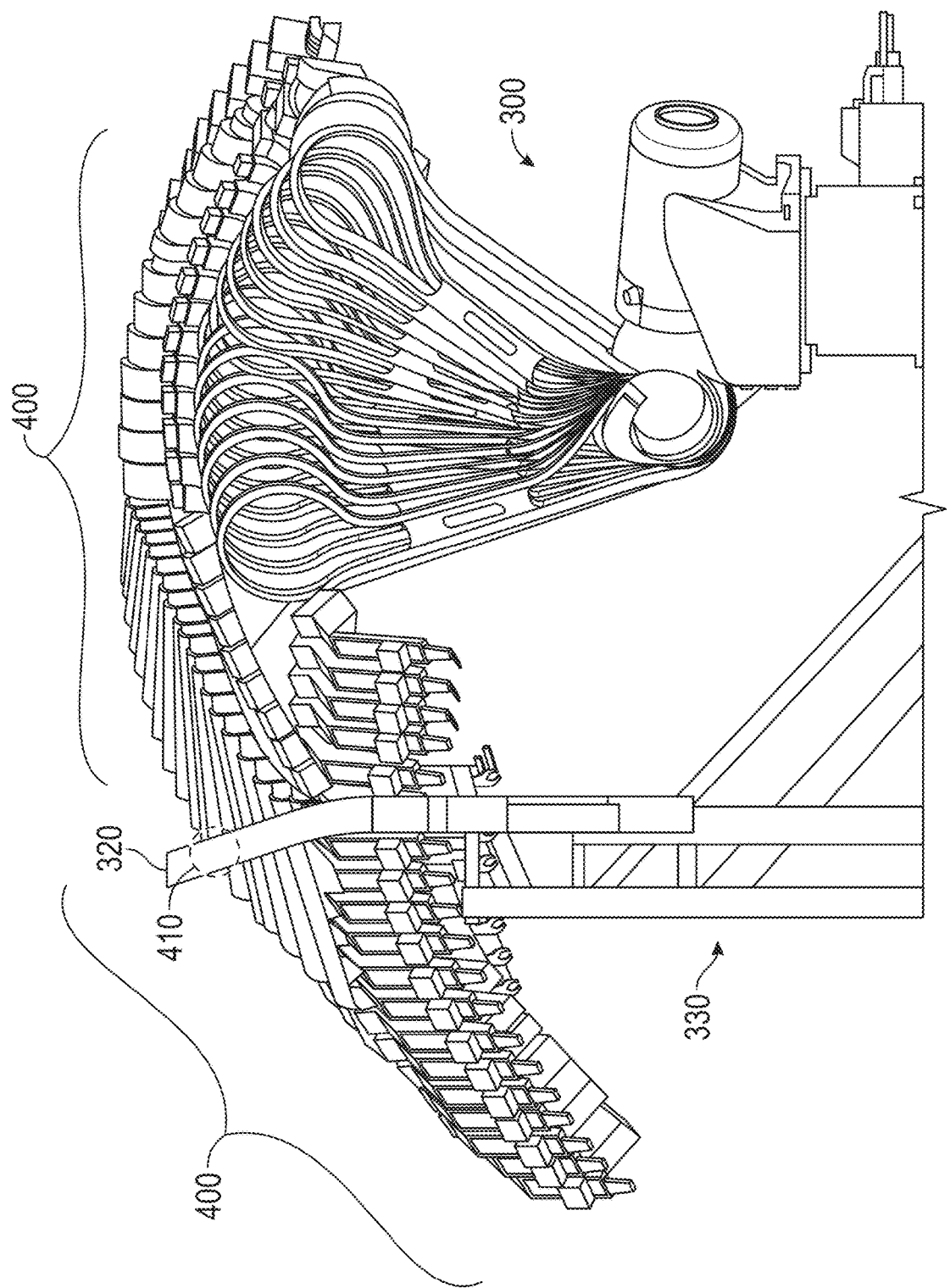
FIG. 4 is a side view illustration of a swept volume created by the robot of FIG. 3 reaching through the vehicle body door opening to perform the operation, depicting one step in the method of the present disclosure.

FIG. 4 is a side view illustration of a swept volume 400 created by the robot 300 of FIG. 3 reaching through the door opening 310 (not visible in FIG. 4) of the vehicle body 320. The swept volume 400 is the cumulative volume occupied by the robot 300 (including the tool 302) during a motion of the robot 300. The swept volume 400 of FIG. 4 captures the motion of the robot from a position outside the vehicle body 320 to a target position where the tool 302 and the robot outer arm are inside the vehicle body 320.

As mentioned earlier, various methods of interference checking a robot motion are known. A preferred method, which uses point sets converted to 1D indices, was disclosed in U.S. patent application Ser. No. 17/457,777, titled POINT SET INTERFERENCE CHECK, filed Dec. 6, 2021 and commonly assigned with the present application, and herein incorporated by reference in its entirety. The aforementioned application is hereinafter referred to as "the '777 application". The point set interference check techniques of the '777 application provide an accurate and efficient method of computing swept volumes for robot motion segments using actual robot link 3D geometry.

The swept volume 400 interferes with the vehicle body 320 in a region shown generally inside circle 410. This interference illustrates a case where the techniques of the present disclosure can be used to create a new robot motion program which moves the tool 302 to the same final target position but uses different robot poses along the path to the target position. Using the modified motion program, the swept volume is "deformed" in such a way as to avoid robot collision with the vehicle body 320. The deformed swept volume is shown in a later figure, following the discussion of the modification method provided below.

Figure 5A:
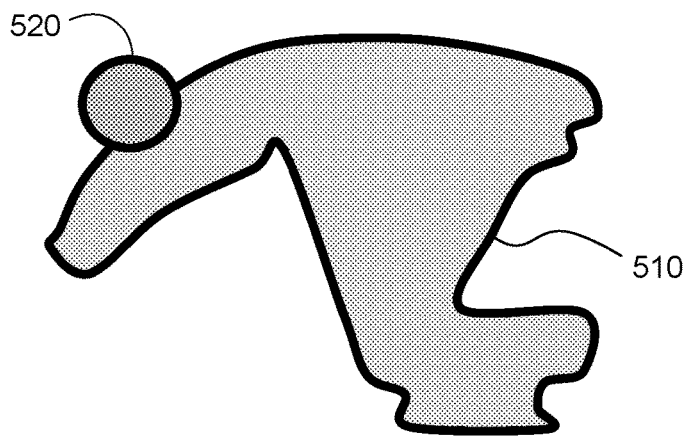
FIG. 5A is an illustration of an outline of the swept volume of FIG. 4, showing an interference condition between a static obstacle and the swept volume of the robot.

FIG. 5A is an illustration of an outline 510 of the swept volume 400 of FIG. 4, showing an interference condition between a static obstacle and the swept volume of the robot 300. The interference condition in FIG. 5A occurs in an area designated by circle 520, which corresponds with the circle 410 of FIG. 4.

Figure 5B:
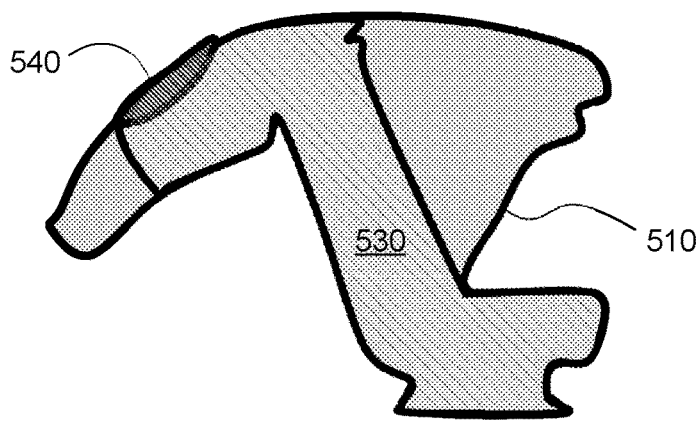
FIG. 5B is an illustration of the outline of the swept volume of FIG. 5A, showing a robot critical posture for the interference condition and a region which the swept volume needs to avoid.

FIG. 5B is an illustration of the outline 510 of the swept volume 400, showing a robot critical posture for the interference condition and a region which the swept volume needs to avoid, according to an embodiment of the present disclosure. A critical posture 530 (shown with hatch lines) is a posture of the robot 300 where the interference condition is at its maximum. The critical posture 530 can be determined by analyzing the interference between the obstacle and the swept volume as depicted in FIG. 4, to identify the step of the robot motion program where the interference is greatest. Other similar techniques of finding the critical posture 530 may also be used as suitable.

Shown at 540 in FIG. 5B is a region to avoid in a modified swept volume of the robot motion. The region 540 is generally defined by the interference of the obstacle with the swept volume 510, accounting for movement of the interference points as the robot arms move through their motion program.

Figure 5C:
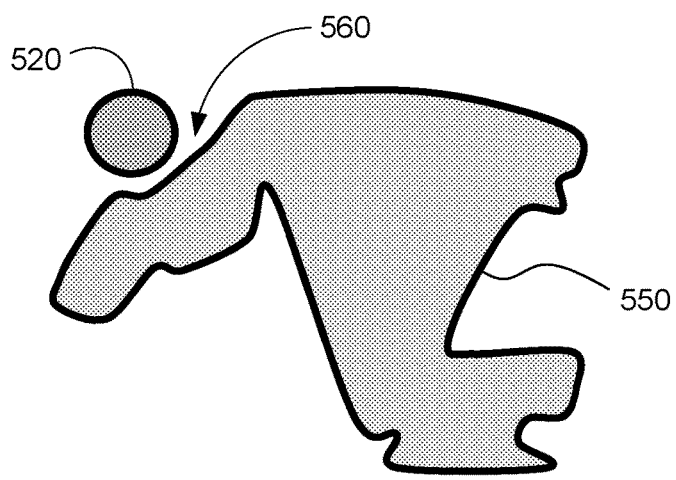
FIG. 5C is an illustration of an outline of a deformed swept volume which resolves the interference condition of FIG. 5A, according to an embodiment of the present disclosure.

FIG. 5C is an illustration of an outline 550 of a deformed swept volume which resolves the interference condition of FIG. 5A, according to an embodiment of the present disclosure. The circle 520 designating the interference condition of FIG. 5A is reproduced in FIG. 5C. As indicated by arrow 560, the outline 550 of the deformed swept volume avoids the earlier interference condition. This is because the robot motion program has been modified to move the robot arms away from the collision points, according to the techniques of the present disclosure. The complete swept volume of the modified motion program, corresponding to the outline 550 of FIG. 5C, is shown in a later figure.

FIG. 6A is a static virtual force and geometry diagram of a robot 600 which illustrates virtual forces applied to robot links in order to avoid an interference with an obstacle, according to an embodiment of the present disclosure. The robot 600 includes a robot base 602, an inner arm link 604, an intermediate arm link 606 and an outer arm link 608. It is to be understood that the robot 600 is illustrated with a simple design merely for the sake of clarity in the drawings and discussion. The disclosed robot pose modification techniques are applicable to any articulated robot, such as the type shown in FIG. 3.

An obstacle 610 is shown having an interference condition with the link 606 of the robot 600. The configuration of the robot 600 illustrated in FIG. 6A represents the critical posture which was discussed earlier with respect to FIGS. 5B-5C. According to the presently disclosed techniques, a calculation can be performed which modifies the critical posture based on interference between one or more obstacles and one or more robot links.

A collision surface $S_{col}$ is the portion of the surface of the obstacle which penetrates a surface of a robot link. The collision surface $S_{col}$ is defined in terms of discrete overlap points $p_i$, four of which are shown in FIG. 6A, numbered 622-628. In order to modify the critical posture to move away from the obstacle, a virtual or artificial force $\Delta p_j$ is defined which acts on the robot arm $link_j$ which has the interference with the obstacle 610. In this case, $link_j$ is the intermediate arm link 606.

The intermediate arm link 606 has a centerline 636. The virtual force $\Delta p_j$ is defined to act normal to the centerline 636 of the $link_j$ (link 606). Each of the overlap points $p_i$ 622-628 contributes an amount to the virtual force $\Delta p_j$ based on the distance that the point penetrates into the robot arm. For example, the leftmost overlap point 622 barely touches the surface of the $link_j$ (link 606), and so the overlap point 622 would have a small force component, defined as acting along a normal from the point 622 to the centerline 636. Similarly, the rightmost overlap point 628 barely touches the surface of the $link_j$ (link 606), and so the overlap point 628 would also have a small force component, defined as acting along a normal from the point 628 to the centerline 636. The middle two overlap points 624-626 have larger penetrations into the link 606, so they would have larger force components, also acting along a respective normal to the centerline 636.

If the same obstacle or a different obstacle interferes with one or more other robot links, a virtual force would be computed and applied to each of those links as well.

As shown in box 650, the virtual force is computed as follows:

$$\Delta p_j = -k \sum_{i \in S_{col}} \frac{p_i - \text{link}_j}{\|p_i - \text{link}_j\|} \tag{1}$$

Where $\Delta p_j$ is the virtual force acting on link$_j$, and (p$_i$–link$_j$)/ ‖p$_i$–link$_j$‖ is the unit vector from link$_j$ to p$_i$, which is summed for all of the overlap points i on the collision surface S$_{col}$. A constant k—essentially a spring constant—is multiplied by the summation. The virtual force $\Delta p_j$ is applied along a normal from the points p$_i$ to the link centerline 636 such that the virtual force acts to push the link away from the obstacle.

Again, although the robot arms are drawn as simple cylindrical geometry primitives in FIGS. 6A/6B, it is preferable to calculate interferences and penetration distances using actual robot arm geometry—such as from CAD models. Interferences and swept volumes can be readily calculated using the point set interference check method of the '777 application discussed above. Also, all of the robot pose geometry, overlap point locations, force vectors, etc., are three-dimensional in nature.

FIG. 6B is a geometry diagram of the robot 600 of FIG. 6A which illustrates how robot pose changes due to the virtual forces to avoid the interference with the obstacle, according to an embodiment of the present disclosure.

As shown in box 670, the robot pose change which occurs as a result of the applied virtual force is computed as follows:

$$\Delta q = J(q)^\dagger \sum_{j \in links} \Delta p_j \quad (2)$$

Where $\Delta q$ is a joint space change in robot configuration, $\Delta p_i$ is the virtual force acting on link$_j$ as computed in Equation (1), where j=1, . . . , 4 (for the four links 602-608), although only link 606 (j=3) has a virtual force due to obstacle penetration in this example, and $J(q)^\dagger$ is the pseudo-inverse of the known Jacobian matrix at the robot configuration q (the pseudo-inverse is used because the true inverse of the Jacobian may not be able to be calculated directly). As mentioned above, if multiple interference conditions exist, a virtual force $\Delta p_i$ may be applied to more than one of the j links.

The joint space change in robot position $\Delta q$ is apparent in the link 606 as shown in FIG. 6B, where the original link centerline 636 (from the critical posture, FIG. 6A) is shown in a dashed line font, and a modified link centerline 636a is shown in a solid line. It can be seen that the link 606 rotated down, away from the obstacle 610, as a result of the virtual force $\Delta p_j$ computed from the obstacle penetration points. The change in robot position $\Delta q$ may include a change of position in multiple robot joints as a result of the applied virtual force $\Delta p_j$.

It is apparent in FIG. 6B that the end of the robot outer arm link 608 is in a different location after pose modification than it was in the critical posture (FIG. 6A). This is an acceptable condition, because the modified critical posture is somewhere in the middle of a planned path, and is not an end-of-path goal point. After the modified critical posture is calculated, this modified posture is used as an intermediate path point for computing a new robot motion program. In other words, a new path is planned from the start point (or previous feasible node) to the goal point (or proposed sample node) while passing through the modified critical posture pose which causes the path to deform away from the obstacle.

Figure 7:
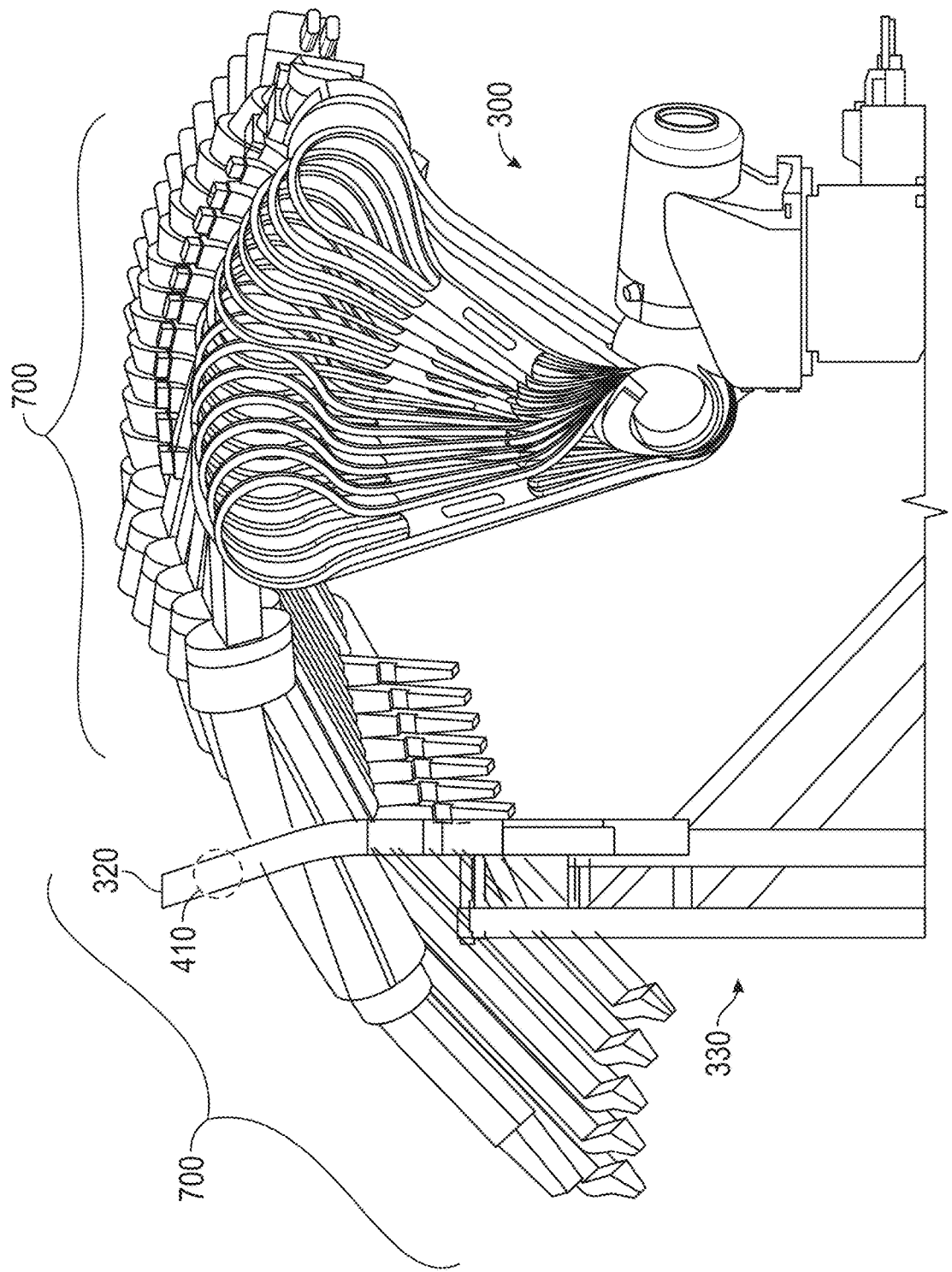
FIG. 7 is a side view illustration of a deformed swept volume created by the robot of FIG. 3 after its motion plan is modified using the technique shown in FIG. 6, according to an embodiment of the present disclosure.

FIG. 7 is a side view illustration of a deformed swept volume 700 created by the robot 300 of FIG. 3 after its motion plan is modified using the technique shown in FIG. 6, according to an embodiment of the present disclosure. Specifically, the robot motion plan has been modified to pass through the modified critical posture, where the modified critical posture is computed to avoid contact with the vehicle body in the region inside the circle 410. With the robot motion plan passing through the modified critical posture, the swept volume 700 is "deformed" away from the region to avoid as compared to the swept volume 400 of FIG. 4.

FIGS. 3-7 illustrate an example where, by modifying an intermediate path point with an interference condition rather than discarding it, the techniques of the present disclosure have been demonstrated to produce a collision-free robot motion program reliably and more efficiently than traditional RRT methods.

Figure 8:
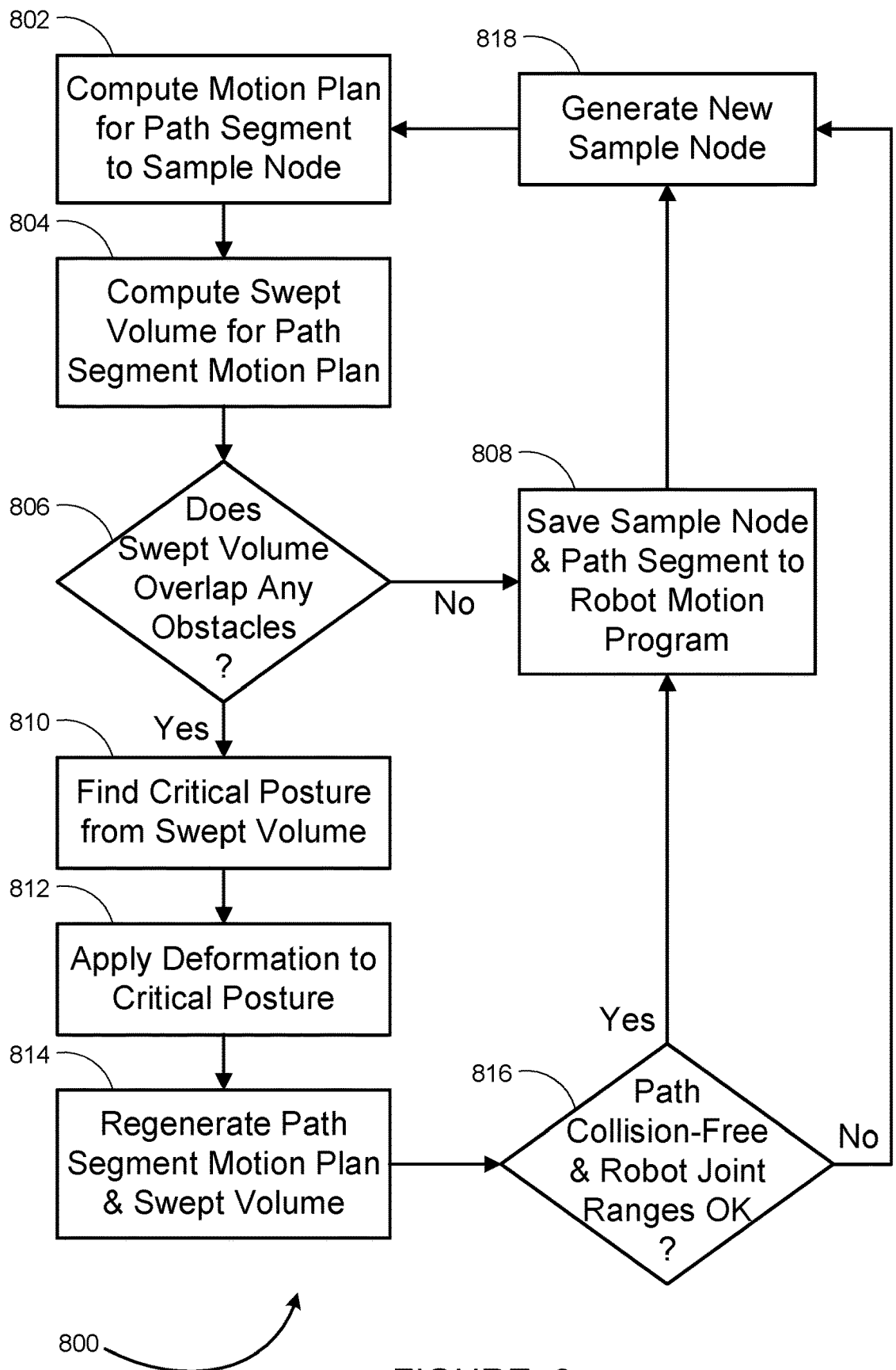
FIG. 8 is a flowchart diagram of a method for robot interference checking path planning using swept volume deformation, according to an embodiment of the present disclosure.

FIG. 8 is a flowchart diagram 800 of a method for robot interference checking path planning using swept volume deformation, according to an embodiment of the present disclosure. At box 802, a motion plan for a path segment is computed. In general terms, in an RRT path finding method, the path segment extends from a previously-computed feasible node to a proposed random sample node. However, the path segment may be a complete robot path from a start point to a goal point. The start point, goal point and the intermediate nodes are six degree of freedom (DOF) robot tool center point poses including three position values and three rotation (orientation) values; the motion plan itself is a complete robot motion plan defining robot pose in terms of joint positions at many points along the motion plan.

At box 804, a swept volume of the path segment motion plan is computed. The swept volume defines the cumulative space that the robot and its tool occupy during the motion along the path segment. At decision diamond 806, it is determined if the swept volume overlaps (interferes) with any obstacles (the workpiece itself as in FIG. 3, or any other obstacle in the robot workcell). If not, then at box 808 the sample node and the path segment are saved to the robot motion program. That is, if there is no interference between the swept volume and any obstacle, then the path segment is collision-free and can be used without modification.

If there is interference between the swept volume and any obstacle, then at box 810 the critical posture is determined. The critical posture may be defined as the robot pose where the interference penetration distance is greatest. The critical posture may alternatively be defined in some other suitable manner—such as the robot pose where interference occurs in an equal number of earlier and later robot motion steps.

At box 812, a deformation is applied to the critical posture, as shown conceptually in FIGS. 5B-5C and described in detail with respect to FIGS. 6A-6B. By computing and applying the virtual force $\Delta p_j$, a modified critical posture is obtained in which the affected robot link(s) have moved away from the obstacle to reduce or eliminate the interference condition.

At box 814, the motion plan for the path segment is regenerated using the modified critical posture, and a swept volume is computed for the modified motion plan. As shown in FIG. 7, the modified swept volume will have a shape which is deformed away from the obstacle in the region to avoid.

At decision diamond 816, the modified motion plan is evaluated to determine if it meets all criteria. One criteria is that the modified swept volume does not interfere with any obstacle. Another criteria is that the robot motion plan does not violate any robot mechanical constraints—such as joint position ranges, and joint velocity and acceleration limits. If the modified motion plan meets all criteria, then at the box 808 the sample node and the modified path segment are saved to the robot motion program.

The severity or extent of interference may also be checked, and the critical pose modification method only applied in the case of minor interference conditions. The interference severity check could be applied in the decision diamond 816 (if the modified path is not collision-free), or applied before the box 810.

If the path segment saved at the box 808 reaches the goal point (the robot tool destination), then the process terminates. If the path segment ends at an intermediate sample node in an RRT path planning algorithm, then at box 818, a new random sample node is generated in the ongoing RRT path finding algorithm, and the process returns to the box 802, where a motion plan for a path segment to the new sample node is computed.

The swept volume deformation technique disclosed above can provide a significant improvement in the efficiency of RRT path planning. However, the technique need not be used within an RRT algorithm, but rather can be used in any type of robot path planning where a collision-free path must be identified, as the disclosed swept volume deformation method computes modified robot paths which deflect away from obstacle collisions.

All of the steps of the method shown in FIG. 8, along with the path planning and swept volume computations and modifications, are programmed in algorithms in software applications and modules which run on one or more computer having a processor and memory. This could include the robot controller 102 or the separate computer 130 discussed above with respect to FIG. 1. A system which performs the interference checking path planning methodology using swept volume deformation includes at least one robot and its corresponding robot controller, and optionally may include the other computer.

As outlined above, the disclosed techniques for robot interference checking path planning using swept volume deformation provide an improved interference checking and collision avoidance method for robot path planning. The disclosed techniques are particularly beneficial when used in an RRT path finding algorithm, where path points having an interference condition may be modified by swept volume deformation rather than discarded—resulting in a more efficient computation of a collision-free robot path.

While a number of exemplary aspects and embodiments of the robot interference checking path planning technique using swept volume deformation have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot collision avoidance motion planning, said method comprising:
   computing, on a computer having a processor and memory, a swept volume of a motion plan for a robot to move along a path segment;
   determining if the swept volume interferes with any obstacles;
   determining a critical posture of interference from the swept volume when the swept volume interferes with any obstacles;
   computing a modified critical posture, including computing a virtual force repelling each robot link from obstacle penetration at the critical posture, including a virtual force vector applied normal to a centerline of each robot link having obstacle penetration at the critical posture, and computing the modified critical posture using the virtual force in a Jacobian matrix calculation;
   computing a deformed swept volume of a modified motion plan for the path segment including the modified critical posture; and
   verifying that the deformed swept volume is collision-free and that the modified motion plan meets robot joint movement constraints.

2. The method according to claim 1 further comprising controlling the robot to follow the modified motion plan, by a robot controller, when the deformed swept volume is collision-free and the modified motion plan meets robot joint movement constraints.

3. The method according to claim 1 wherein determining the critical posture of interference includes defining the critical posture as a robot pose corresponding to a maximum penetration of any obstacle into the swept volume.

4. The method according to claim 1 wherein computing the virtual force includes the virtual force vector having a magnitude calculated by summing a penetration distance of obstacle surface points into the robot link and multiplying by a spring constant.

5. The method according to claim 4 wherein computing the modified critical posture includes multiplying the virtual force vector, for each robot link with obstacle penetration, by a pseudo-inverse of a Jacobian matrix relating joint velocities to link velocities at the critical posture.

6. The method according to claim 1 wherein the robot joint movement constraints include joint angle ranges, and joint velocity and acceleration limits.

7. The method according to claim 1 wherein computing a swept volume and determining if the swept volume interferes with any obstacles includes using a point set methodology which converts 3D points to 3D indices indicating occupied space, converts the 3D indices to 1D indices and stores the 1D indices as sets per object and per time step, performs an interference check computation by intersection of the sets for a given time step, and performs a swept volume computation by union of the sets across multiple time steps.

8. The method according to claim 1 wherein the path segment is a proposed segment from a feasible node to a random sample node in a sampling-based path planning algorithm.

9. The method according to claim 1 further comprising determining a severity of interference between the swept volume and any obstacles, and only computing the modified critical posture and the deformed swept volume when the severity of interference is below a predefined threshold.

10. A method for robot collision avoidance motion planning, said method comprising:
    running a sampling-based path planning algorithm, on a computer having a processor and memory, to find a collision-free path for a robot to move from a start point to a goal point;
    defining a random sample node in the path planning algorithm and computing a path segment from a feasible node to the random sample node;
    computing a swept volume of a motion plan for the path segment;
    determining if the swept volume interferes with any obstacles;
    determining a critical posture of interference from the swept volume when the swept volume interferes with any obstacles;

computing a modified critical posture, including computing a virtual force repelling each robot link from obstacle penetration at the critical posture, including a virtual force vector applied normal to a centerline of each robot link having obstacle penetration at the critical posture, and computing the modified critical posture using the virtual force in a Jacobian matrix calculation;

computing a deformed swept volume of a modified motion plan for the path segment including the modified critical posture;

verifying that the deformed swept volume is collision-free and that the modified motion plan meets robot joint movement constraints;

adding the sample node and the modified motion plan as feasible elements of the collision-free path; and defining a new random sample node in the path planning algorithm.

11. The method according to claim 10 wherein determining the critical posture of interference includes defining the critical posture as a robot pose corresponding to a maximum penetration of any obstacle into the swept volume.

12. The method according to claim 10 wherein computing the virtual force includes the virtual force vector having a magnitude calculated by summing a penetration distance of obstacle surface points into the robot link and multiplying by a spring constant, and where computing the modified critical posture includes multiplying the virtual force vector, for each robot link with obstacle penetration, by a pseudo-inverse of a Jacobian matrix relating joint velocities to link velocities at the critical posture.

13. The method according to claim 10 further comprising determining a severity of interference between the swept volume and any obstacles, and only computing the modified critical posture and the deformed swept volume when the severity of interference is below a predefined threshold.

14. A robot system with collision avoidance motion planning, said system comprising:
a robot configured to perform an operation on a workpiece;
a controller, having a processor and memory, controlling the robot; and
a motion planner software module running on the controller or on a separate computer, where the motion planner software module is configured to;
compute a swept volume of a motion plan for the robot to move along a path segment;
determine if the swept volume interferes with any obstacles;
determine a critical posture of interference from the swept volume when the swept volume interferes with any obstacles;
compute a modified critical posture, including computing a virtual force repelling each robot link from obstacle penetration at the critical posture, including a virtual force vector applied normal to a centerline of each robot link having obstacle penetration at the critical posture, and computing the modified critical posture using the virtual force in a Jacobian matrix calculation;
compute a deformed swept volume of a modified motion plan for the path segment including the modified critical posture; and
verify that the deformed swept volume is collision-free and that the modified motion plan meets robot joint movement constraints.

15. The system according to claim 14 further comprising controlling the robot to follow the modified motion plan, by the controller, when the deformed swept volume is collision-free and the modified motion plan meets robot joint movement constraints including joint angle ranges and joint velocity and acceleration limits.

16. The system according to claim 14 wherein determining the critical posture of interference includes defining the critical posture as a robot pose corresponding to a maximum penetration of any obstacle into the swept volume.

17. The system according to claim 14 wherein computing the virtual force includes the virtual force vector having a magnitude calculated by summing a penetration distance of obstacle surface points into the robot link and multiplying by a spring constant.

18. The system according to claim 17 wherein computing the modified critical posture includes multiplying the virtual force vector, for each robot link with obstacle penetration, by a pseudo-inverse of a Jacobian matrix relating joint velocities to link velocities at the critical posture.

19. The system according to claim 14 wherein computing a swept volume and determining if the swept volume interferes with any obstacles includes using a point set methodology which converts 3D points to 3D indices indicating occupied space, converts the 3D indices to 1D indices and stores the 1D indices as sets per object and per time step, performs an interference check computation by intersection of the sets for a given time step, and performs a swept volume computation by union of the sets across multiple time steps.

20. The system according to claim 14 wherein the path segment is a proposed segment from a feasible node to a random sample node in a sampling-based path planning algorithm.

* * * * *